US011999602B2

(12) United States Patent
Donaldson

(10) Patent No.: US 11,999,602 B2
(45) Date of Patent: Jun. 4, 2024

(54) BOOM ASSEMBLY WITH TRANSLATABLE COUNTERBALANCE MASS

(71) Applicant: Terex South Dakota, Inc., Watertown, SD (US)

(72) Inventor: James A. Donaldson, Puyallup, WA (US)

(73) Assignee: Terex South Dakota, Inc., Watertown, SD (US)

( * ) Notice: Subject to any disclaimer, the term of this patent is extended or adjusted under 35 U.S.C. 154(b) by 485 days.

(21) Appl. No.: 16/837,572

(22) Filed: Apr. 1, 2020

(65) Prior Publication Data

US 2021/0309503 A1 Oct. 7, 2021

(51) Int. Cl.

*B66F 11/04* (2006.01)
*B66F 13/00* (2006.01)
*B66C 23/64* (2006.01)
*B66C 23/72* (2006.01)

(52) U.S. Cl.

CPC ............ *B66F 11/044* (2013.01); *B66F 13/00* (2013.01); *B66C 23/64* (2013.01); *B66C 23/72* (2013.01)

(58) Field of Classification Search

CPC ........ B66F 11/044; B66F 13/00; B66C 23/64; B66C 23/72

See application file for complete search history.

(56) References Cited

U.S. PATENT DOCUMENTS 1,068,279 A * 7/1913 Schrader ................ B66C 23/76 212/196
1,614,979 A * 1/1927 Cole ...................... B66C 23/72 212/197
2,421,437 A 6/1947 Ryan et al.
2,722,320 A 11/1955 Dobeus et al.
3,224,528 A * 12/1965 Hubbard .............. B66F 11/046 182/2.8
3,240,353 A * 3/1966 Leavesley .............. B66C 13/18 212/196
3,743,049 A * 7/1973 Levrini ................ B66F 11/044 212/196

(Continued)

FOREIGN PATENT DOCUMENTS

DE 3020562 A1 12/1981

OTHER PUBLICATIONS

PCT International Search Report and Written Opinion of the International Search Authority Dated Jul. 19, 2021, Application No. PCT/US21/25310, Applicant Terex Souch Dakota, Inc., 11 Pages.

(Continued)

*Primary Examiner* — Daniel P Cahn
*Assistant Examiner* — Shiref M Mekhaeil
(74) *Attorney, Agent, or Firm* — Brooks Kushman P.C.

(57) ABSTRACT

A boom assembly according to the disclosure may include a lower boom structure, and an upper boom structure that is connected to the lower boom structure. In addition, the boom assembly may include a counterweight movably mounted on one of the boom structures and movable along the one boom structure when at least a portion of the lower boom structure is moved relative to the upper boom structure or when at least a portion of the upper boom structure is moved relative to the lower boom structure.

19 Claims, 5 Drawing Sheets

(56) References Cited

U.S. PATENT DOCUMENTS

| | | | | | |
|---|---|---|---|---|---|
| 3,842,933 | A * | 10/1974 | Clark | B66F 11/044 | 182/63.1 |
| 3,871,265 | A | 3/1975 | Koga et al. | | |
| 4,019,604 | A * | 4/1977 | Benson | B66F 11/044 | 182/141 |
| 4,286,720 | A * | 9/1981 | Atkinson | B66C 23/74 | 212/178 |
| 4,476,955 | A * | 10/1984 | Carter | B66F 11/046 | 182/2.8 |
| 4,512,436 | A * | 4/1985 | Freudenthal | B66F 11/044 | 182/2.2 |
| 4,633,977 | A * | 1/1987 | Holmes | B66F 11/044 | 187/244 |
| 4,666,364 | A * | 5/1987 | Doege | B66C 13/42 | 414/742 |
| 4,943,019 | A * | 7/1990 | Mester | F16M 13/00 | 318/265 |
| 5,016,731 | A * | 5/1991 | Holmes | B66F 11/044 | 254/228 |
| 5,129,480 | A * | 7/1992 | Garrett | B66F 11/044 | 182/141 |
| 5,203,837 | A | 4/1993 | Madic et al. | | |
| 5,669,517 | A * | 9/1997 | Donaldson | B66F 11/046 | 212/196 |
| 5,697,757 | A * | 12/1997 | Lindsay | F16M 11/18 | 212/197 |
| 5,746,286 | A * | 5/1998 | Mlaker | B66F 11/044 | 182/2.1 |
| 5,799,806 | A * | 9/1998 | Cullity | B66F 11/044 | 212/196 |
| 5,856,862 | A * | 1/1999 | Kokush | F16M 11/425 | 352/243 |
| 5,899,347 | A | 5/1999 | Cullity | | |
| 5,934,409 | A * | 8/1999 | Citron | B66F 11/044 | 182/17 |
| 5,944,204 | A * | 8/1999 | Vollmer | B66F 11/044 | 182/2.9 |
| 6,109,463 | A | 8/2000 | Cullity | | |
| 6,341,665 | B1 * | 1/2002 | Zhou | B66C 23/76 | 212/196 |
| 8,540,438 | B1 * | 9/2013 | Cronin | B66F 11/048 | 396/428 |
| 9,278,834 | B2 * | 3/2016 | Pech | B66C 23/76 | |
| 2003/0076480 | A1 * | 4/2003 | Burbulla | B66F 11/048 | 396/419 |
| 2009/0134106 | A1 * | 5/2009 | Martin | B66C 23/48 | 212/196 |
| 2011/0309213 | A1 * | 12/2011 | Valles Navarro | B66C 23/72 | 248/123.2 |
| 2020/0140249 | A1 * | 5/2020 | Hackenberg | B66F 13/00 | |

OTHER PUBLICATIONS

International Preliminary Report on Patentability dated Jul. 8, 2022, Application No. PCT/2021/025310, Applicant Terex South Dakota, Inc., 21 Pages.

* cited by examiner

BOOM ASSEMBLY WITH TRANSLATABLE COUNTERBALANCE MASS

TECHNICAL FIELD

The disclosure relates to a boom assembly with a movable counterbalance mass or counterweight, and a vehicle including such a boom assembly.

BACKGROUND

A vehicle, such as an aerial work platform or crane, may be provided with a boom assembly. Examples of such vehicles are disclosed in U.S. Pat. Nos. 5,669,517, 5,899,347, 6,109,463 and 6,341,665.

SUMMARY

A boom assembly according to the disclosure may include a lower boom structure, and an upper boom structure connected to the lower boom structure. In addition, the boom assembly may include a counterweight movably mounted on one of the boom structures and movable along the one boom structure when at least a portion of the lower boom structure is moved relative to the upper boom structure or when at least a portion of the upper boom structure is moved relative to the lower boom structure.

A vehicle according to the disclosure may include a chassis, a lower boom structure mounted on the chassis, and an upper boom structure attached to the lower boom structure. In addition, the vehicle may include a counterweight movably mounted on one of the boom structures and translatable along the one boom structure when at least a portion of the lower boom structure is moved relative to the upper boom structure or when at least a portion of the upper boom structure is moved relative to the lower boom structure.

Further under the disclosure, a boom assembly may include a boom structure having at least a portion that is movable between first and second positions. In addition, the boom assembly may include a counterweight mounted on the boom structure and movable along the boom structure when the at least a portion of the boom structure is moved between the first and second positions.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary, and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
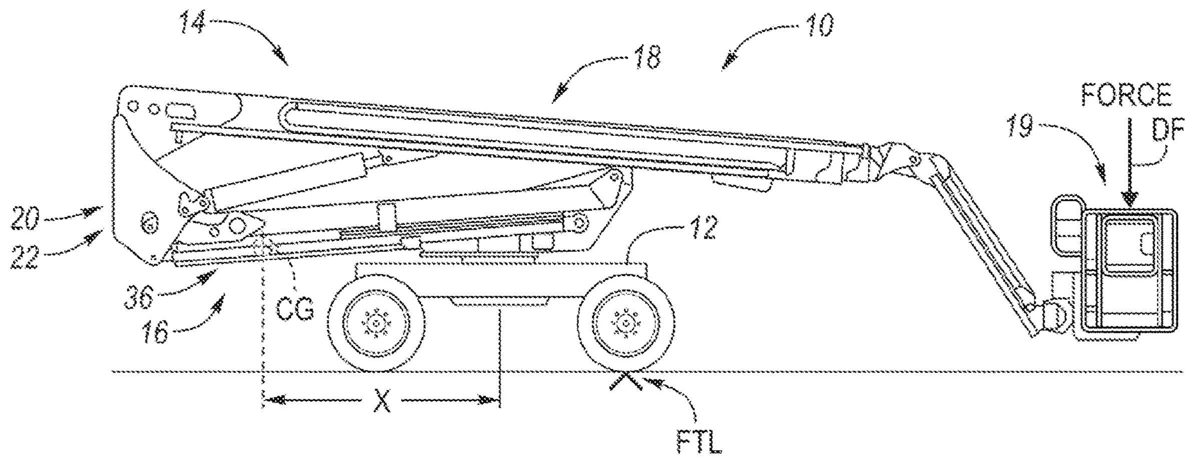
FIG. 1 is a side view of a vehicle including a boom assembly according to the present disclosure.

FIG. 1 shows a vehicle 10 according to the present disclosure, which may be an aerial work platform, or any other vehicle including a lifting device. The vehicle 10 includes a base, such as a frame or chassis 12; one or more movement facilitating members, such as wheels or tracks, movably attached to the chassis 12; a drive system (not shown), such as an engine or one or more electric motors, for driving the movement facilitating members; and a boom assembly 14 according to the present disclosure mounted on the chassis 12. The boom assembly 14 is movable from a lowered position, shown in FIG. 1, to an intermediate position shown in FIG. 2, and then to a raised position, shown in FIG. 3. In addition, or as an alternative, one or more portions of the boom assembly 14 may be movable between retracted and extended positions. Furthermore, the boom assembly 14 includes a movable counterbalance mass or counterweight for adjusting a center of gravity or center of mass of the boom assembly 14 in order to maintain a center of mass of the vehicle 10 in a desired location or area (e.g., within a “tip line” or “tipping line” of the vehicle 10) as the boom assembly 14 moves between the lowered and raised positions and/or when the boom assembly 14 is moved between retracted and extended positions, as explained below in further detail.

The boom assembly 14 may include any suitable configuration for moving between the lowered and raised positions. In the embodiment shown in FIGS. 1-3, for example, the boom assembly 14 includes a lower boom structure 16 pivotally attached to the chassis 12 so that the lower boom structure 16 is pivotable with respect to the chassis 12 between a lowered position, shown in FIG. 1, and a raised position, shown in FIG. 3, and an upper boom structure 18 that is pivotally attached to the lower boom structure 16 so that the upper boom structure 18 is pivotable with respect to the lower boom structure 16 between a lowered position, shown in FIG. 1, and a raised position, shown in FIG. 3. The illustrated embodiment further includes a work platform 19 pivotably attached to the upper boom structure 18. The work platform 19 may be configured to receive one or more workers and other cargo, such as one or more toolboxes. The work platform 19 may also include suitable controls for operating the boom assembly 14 and/or other aspects of the vehicle 10, such as the drive system for moving the vehicle 10. In another embodiment, the boom assembly 14 may include a forklift or any other suitable support or lift component attached to the upper boom structure 18.

Figure 2:
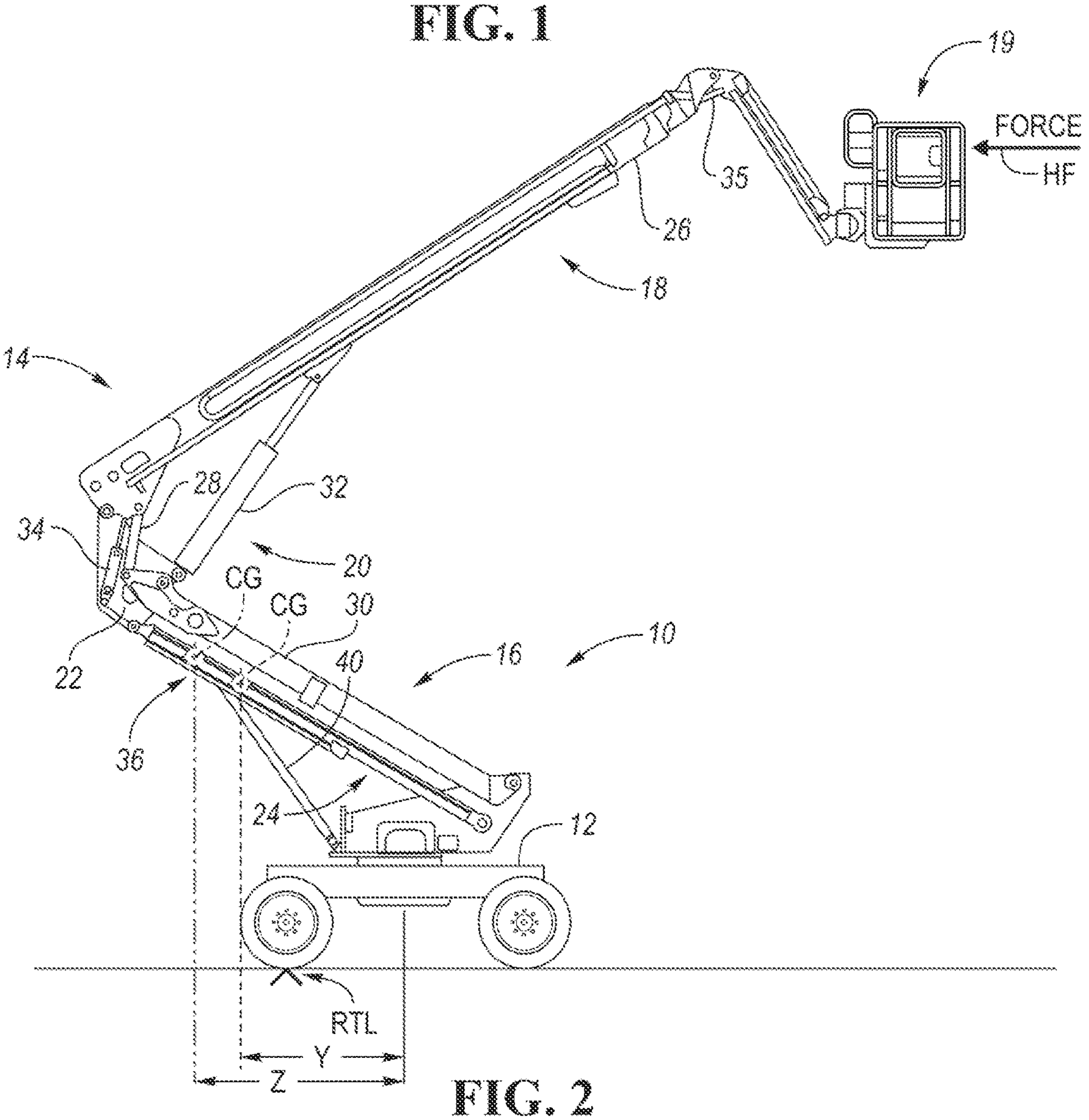
FIG. 2 is a side view of the vehicle of FIG. 1 with the boom assembly moved to an intermediate position.
Figure 3:
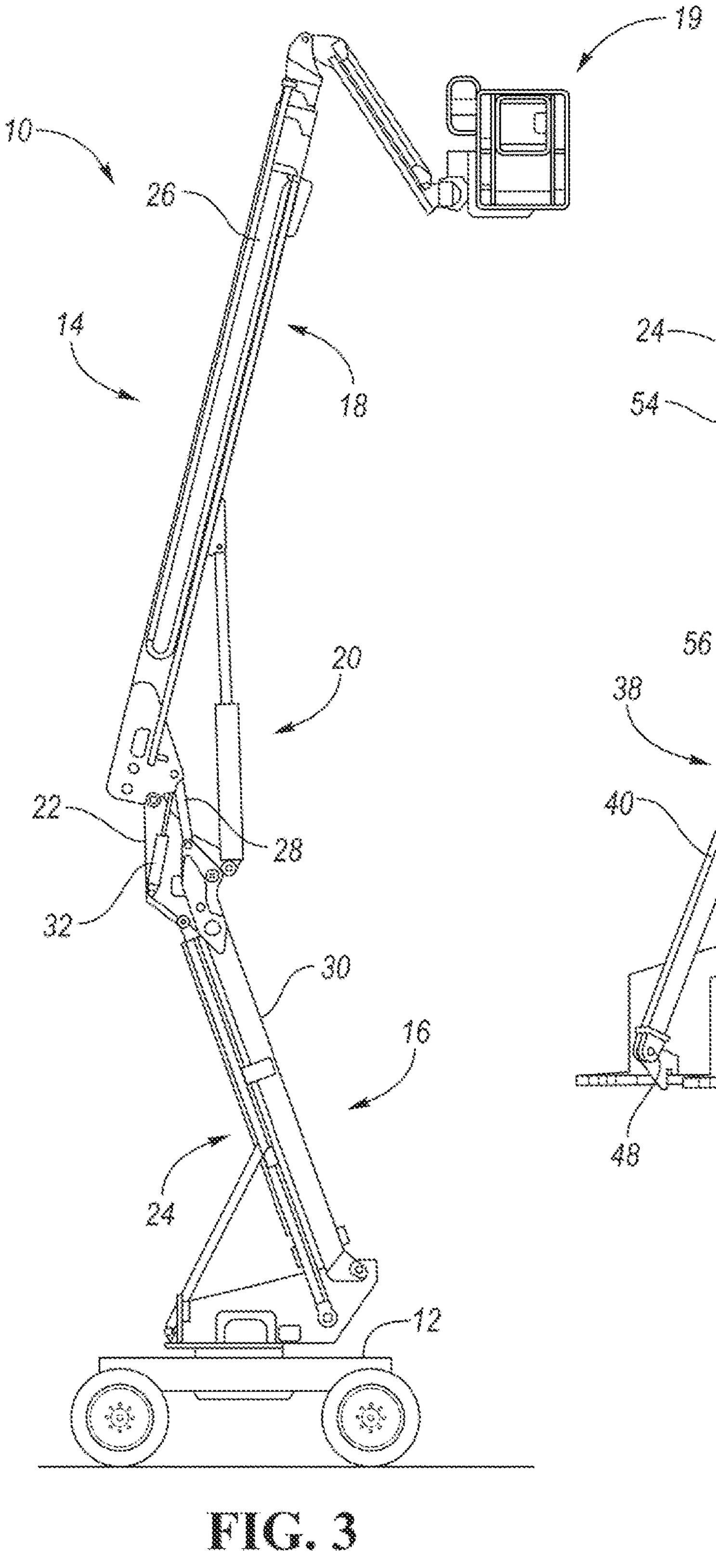
FIG. 3 is a side view of the vehicle of FIG. 1 with the boom assembly moved to a raised position.

Referring to FIG. 2, the boom assembly 14 also includes a pivot arrangement 20 for pivotally connecting the lower boom structure 16 to the upper boom structure 18. For example, the pivot arrangement 20 may include a pivot member, such as a mid-pivot 22, that is pivotably connected to a boom member, such as a lower riser boom 24, of the lower boom structure 16 and a boom member, such as a primary boom 26, of the upper boom structure 18. The pivot arrangement 20 may further include a link 28 having one end that is pivotably connected to a second boom member, such as an upper riser boom 30, of the lower boom structure 16, and an opposite end that is pivotably connected to the primary boom 26 of the upper boom structure 18. In addition, the pivot arrangement 20 may include a drive member or actuator, such as a cylinder 32 (e.g., a piston connected to a piston rod, and a corresponding chamber or cylinder barrel that receives the piston), connected to the mid-pivot 22 and the primary boom 26. As the cylinder 32 is extended (e.g., when the piston rod is moved outwardly with respect to the cylinder barrel), the primary boom 26 rises and pulls on the link 28, which pulls on the upper riser boom 30 of the lower boom structure 16, thereby moving the boom assembly 14 from the lowered position, shown in FIG. 1, to the raised position, shown in FIG. 3. When the cylinder 32 is retracted (e.g., when the piston rod is moved inwardly with respect to the cylinder barrel), the boom assembly 14 may move from the raised position, shown in FIG. 3, to the lowered position, shown in FIG. 1. The lower riser boom 24 may also act as a timing member as the boom assembly 14 moves between the lowered and raised positions.

In addition, the boom assembly 14 may include one or more additional drive members for adjusting position of the work platform 19, or other suitable component attached to the upper boom structure 18, to keep the work platform 19 or other component in a desired orientation, such as level. In the illustrated embodiment, the boom assembly 14 includes a master cylinder 34 connected to the primary boom 26 and the mid-pivot 22, and a slave cylinder 35 associated with the master cylinder 34 and connected to the primary boom 26 and the work platform 19, and the cylinders 34, 35 are operable together to adjust position of the work platform 19 or other component attached to the upper boom structure 18 when the boom assembly 14 is moved between the lowered and raised positions.

Figure 4:
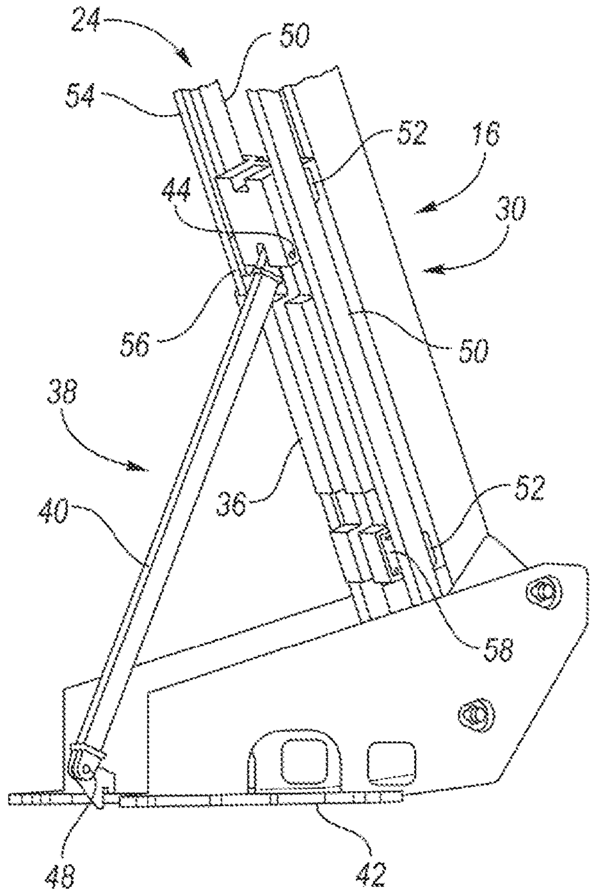
FIG. 4 is a fragmentary perspective view of the boom assembly showing a movable counterbalance mass or counterweight for adjusting position of a center of mass of the boom assembly as the boom assembly moves between the lowered and raised positions.

The above-mentioned counterweight may be movably mounted on one of the boom structures 16, 18 so that the counterweight is movable along the one boom structure 16, 18 when the boom assembly 14 is moved between the lowered and raised positions (e.g., when the upper boom structure 18 is moved between its lowered and raised positions) and/or when the boom assembly 14 is moved between retracted and extended positions. Referring to FIG. 4, for example, the boom assembly 14 may include a counterweight 36 movably (e.g., slidably) mounted on the lower boom structure 16. The boom assembly 14 further includes a drive mechanism or drive member 38 for moving (e.g., linearly translating or sliding) the counterweight 36 along the lower boom structure 16. For example, the drive member 38 may comprise a link 40 (e.g., rigid metal link) having a first end pivotally connected to the counterweight 36, and an opposite second end pivotally connected directly to the chassis 12 or to a support member, such as a rotatable turret or turntable 42, rotatably mounted on the chassis 12. With such a configuration, the counterweight 36 may be automatically moved downwardly along the lower boom structure 16 (e.g., toward the end of the lower boom structure 16 that is pivotably connected directly or indirectly to the chassis 12) when the boom assembly 14 is moved from the lowered position to the raised position (e.g., when the upper boom structure 18 is moved from the lowered position to the raised position). Likewise, the counterweight 36 may be automatically moved upwardly along the lower boom structure 16 (e.g., toward the end of the lower boom structure 16 that is pivotably connected to the mid-pivot 22, or other portion of the pivot arrangement 20), when the boom assembly 14 is moved from the raised position to the lowered position (e.g., when the upper boom structure 18 is moved from the raised position to the lowered position). Furthermore, the counterweight 36 and boom assembly 14 may be configured so that the counterweight 36 is movable relative to the lower boom structure 16 along a distance in any suitable range, such as a range of 100 to 300 cm, or a range of 175 to 250 cm.

As a more specific example and referring to FIG. 1, which shows the boom assembly 14 in the lowered position, the counterweight 36 may be positioned as far to the left as possible (i.e., toward the end of the lower boom structure 16 that is pivotably connected to the mid-pivot 22, or other portion of the pivot arrangement 20). With such a configuration, a center of gravity CG of the counterweight 36 may be positioned as far away (e.g., to the left in FIG. 1) as possible with respect to a center of the chassis 12 so that a distance X between the center of gravity CG of the counterweight 36 and the center of the chassis 12 is at a maximum. As a result, a potential tipping situation (e.g., a forward tipping situation) about a tipping line (e.g., a forward or front tipping line FTL) may be inhibited or avoided when a downward force DF (caused by workers, tools, cargo, etc. and/or contact with a structure) is applied to the work platform 19. When the boom assembly 14 is moved from the lowered position toward the intermediate position shown in FIG. 2, the counterweight 36 may be moved to the right (i.e., toward the end of the lower boom structure 16 that is pivotably connected directly or indirectly to the chassis 12). With such a configuration, the center of gravity CG of the counterweight 36 may be positioned closer to the center of the chassis 12 so that a distance Y between the center of gravity CG of the counterweight 36 and the center of the chassis 12 is smaller than a distance Z, which is the distance between the center of gravity CG (shown in phantom lines) and the center of the chassis 12 had the counterweight 36 not been moved. As a result, a tipping situation (e.g., a rearward tipping situation) about a tipping line (e.g., a rearward or rear tipping line RTL) may be inhibited or avoided when a horizontal force HF (caused by wind and/or contact with a structure, for example) is applied to the work platform 19. Likewise, when the boom assembly 14 is moved from the intermediate position toward the raised position shown in FIG. 3, the counterweight 36 may be moved further to the right (i.e., further toward the end of the lower boom structure 16 that is pivotably connected directly or indirectly to the chassis 12 as compared to the position shown in FIG. 2) to inhibit or avoid a rearward tipping situation when the boom assembly 14 is in the raised position.

Figure 5:
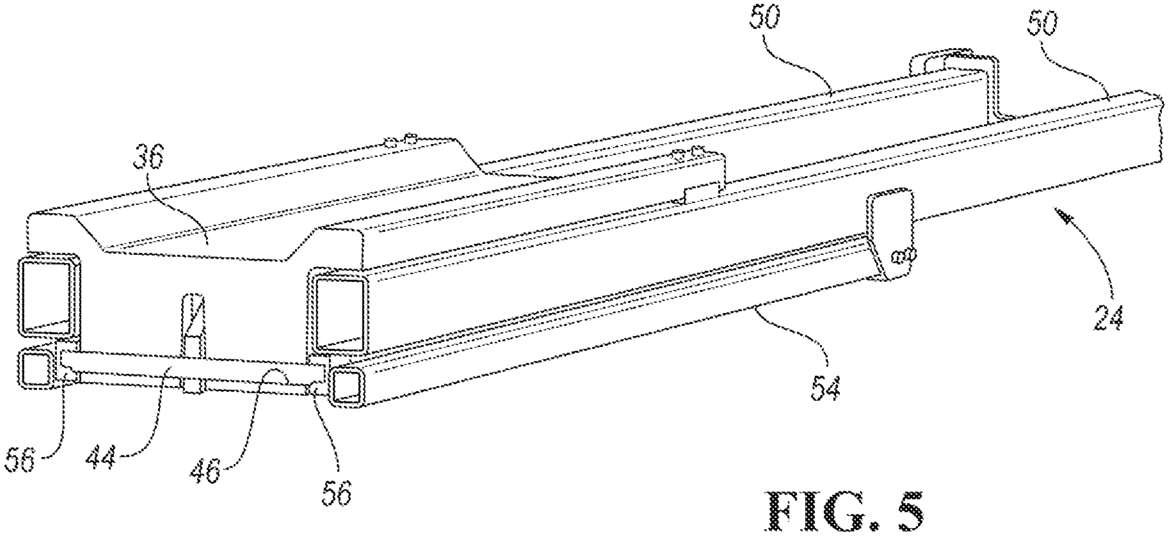
FIG. 5 is a sectional perspective view of a portion of the boom assembly showing the counterweight slidably mounted on two elongated guide members.
Figure 6:
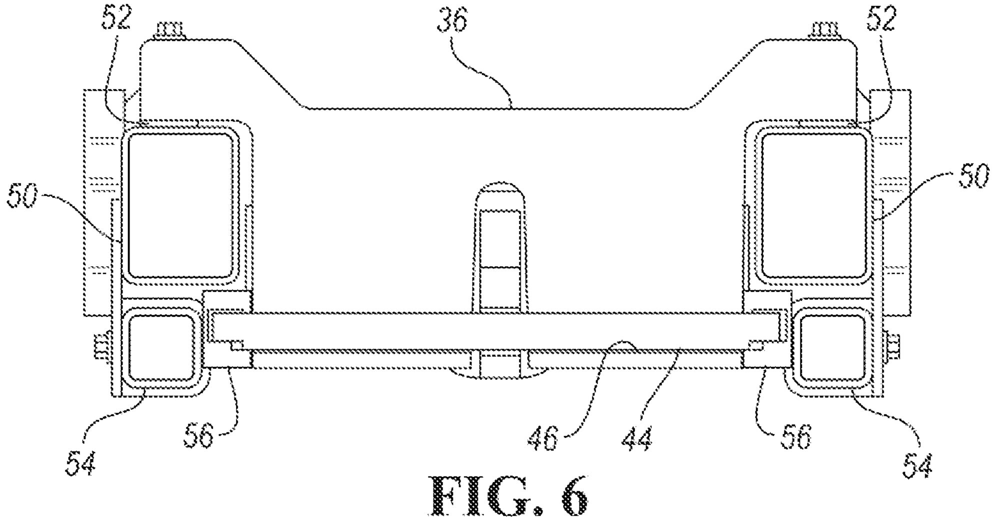
FIG. 6 is a sectional end view of the portion of the boom assembly shown in FIG. 5, wherein the boom assembly includes multiple guide elements that are engageable with the elongated guide members.

The above described link 40 may be connected to the counterweight 36 and the chassis 12 or turntable 42 in any suitable manner. Referring to FIGS. 4-6, for example, the first end of the link 40 may be connected to the counterweight 36 with a connecting element, such as a rod or pin 44, that extends through a bore 46 formed in the counterweight 36. Likewise, the second end of the link 40 may be connected to a bracket of the turntable 42 with a connecting element, such as a rod or pin 48.

Figure 7:
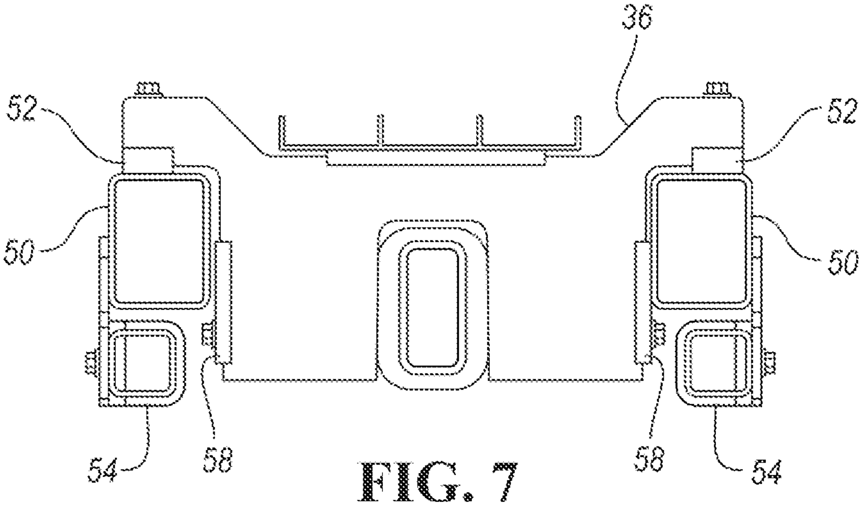
FIG. 7 is a sectional end view of a lower end of the portion of the boom assembly shown in FIG. 5 and showing additional guide elements that are engageable with the elongated guide members.

Referring to FIGS. 4-7, the lower boom structure 16 may include one or more elongated guide members for guiding movement of the counterweight 36, and the boom assembly 14 may further include one or more bearing elements or guide elements associated with the counterweight 36 and that are engageable with the one or more guide members. In the illustrated embodiment, the lower riser boom 24 of the lower boom structure 16 defines two spaced-apart, elongated guide members 50 that are connected together (e.g., with laterally extending brackets or other support members) and disposed on opposite sides of the counterweight 36, and the counterweight 36 includes multiple bearing elements or guide elements 52 that are each engageable (e.g., slidably engageable) with a first side of a respective elongated guide member 50. The lower boom structure 16 further includes two additional elongated guide members, such as guard members 54, that are each attached to a respective elongated guide member 50, and the boom assembly 14 includes two bearing elements 56 positioned at opposite ends of the pin 44 and that are each engageable (e.g., slidably engageable) with a respective guard member 54 (the right side guard member 54 has been removed from FIG. 4 to show the location of the pin 44 that connects the counterweight 36 to the link 40). The bearing elements 56 are also each positioned adjacent to a second side of a respective elongated guide member 50 that is opposite the first side of the elongated guide member 50, so that each bearing element 56 is engageable with the second side of a respective elongated guide member 50. Referring to FIGS. 4 and 7, the counterweight 36 further includes two side guide elements or bearing elements 58 that are each engageable (e.g., slidably engageable) with a side surface of a respective guard member 54.

With the above configuration, position of the counterweight 36 may be automatically adjusted during raising and lowering of the boom assembly 14. For example, the counterweight 36 may automatically slide or translate linearly along the lower boom structure 16 during movement of the boom assembly 14, so that the center of mass of the vehicle 10 may remain within a desired location or area of the vehicle 10 (e.g., within a "tipping triangle" of the vehicle 10, which may be defined by the front tipping line FTL, the rear tipping line RTL and a point along a centerline of the chassis 12 located above the tipping lines) to inhibit tipping of the vehicle 10. The counterweight 36 may create a counteracting force on a side of a tipping fulcrum of the vehicle 10 that is opposite to a side on which a tipping force is created by mass or load applied to the work platform 19 or other component attached to the upper boom structure 18. As a result, load (e.g., workers, tools, cargo, etc.) added on the work platform 19 may actually be increased compared to prior vehicles. In one embodiment, for example, the load may be increased from 500 pounds to at least 650 pounds (e.g., 660 pounds). Furthermore, mass of the overall vehicle 10 can be reduced compared to prior vehicles. For example, smaller components (e.g., wheels and/or tires) may be used, thereby reducing cost of the vehicle 10.

The counterweight 36 may be made of any suitable material, such as cast iron, steel and/or lead. Furthermore, the counterweight 36 may have any suitable size and mass depending on the size of the vehicle 10. For example, the counterweight 36 may have a mass of at least 1,000 pounds (e.g., 1,200 pounds or more). As another example, the counterweight 36 may have a mass of at least 2000 pounds, or at least 2500 pounds. As yet another example, the counterweight 36 may have a mass that is in the range of 5 to 15% (e.g., 10%) of the total mass of the vehicle 10, or at least 5% or at least 10% of the total mass of the vehicle 10.

Figure 8A:
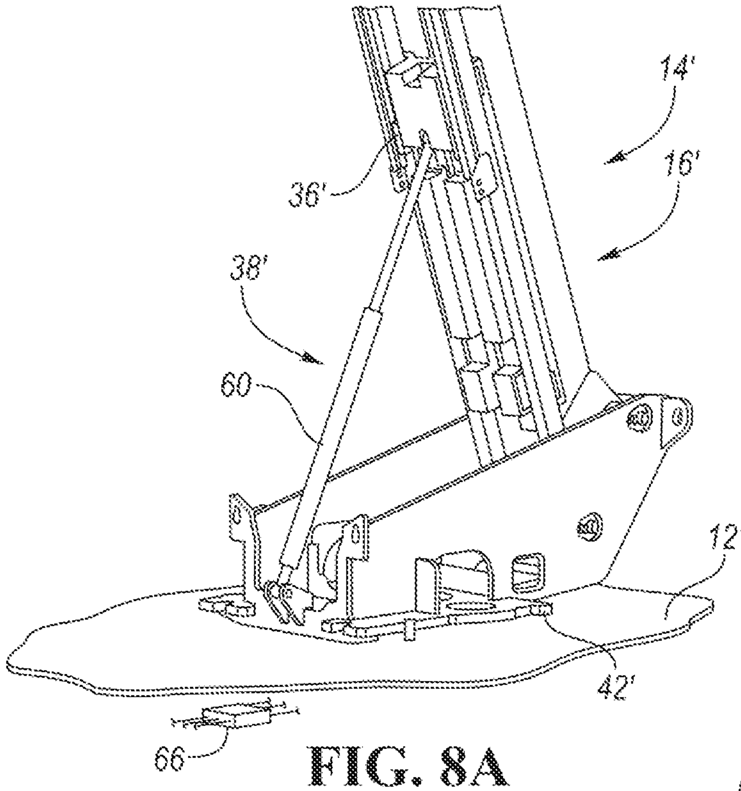
FIG. 8A is a fragmentary perspective view of a vehicle and a portion of a boom assembly according to a second embodiment.
Figure 8B:
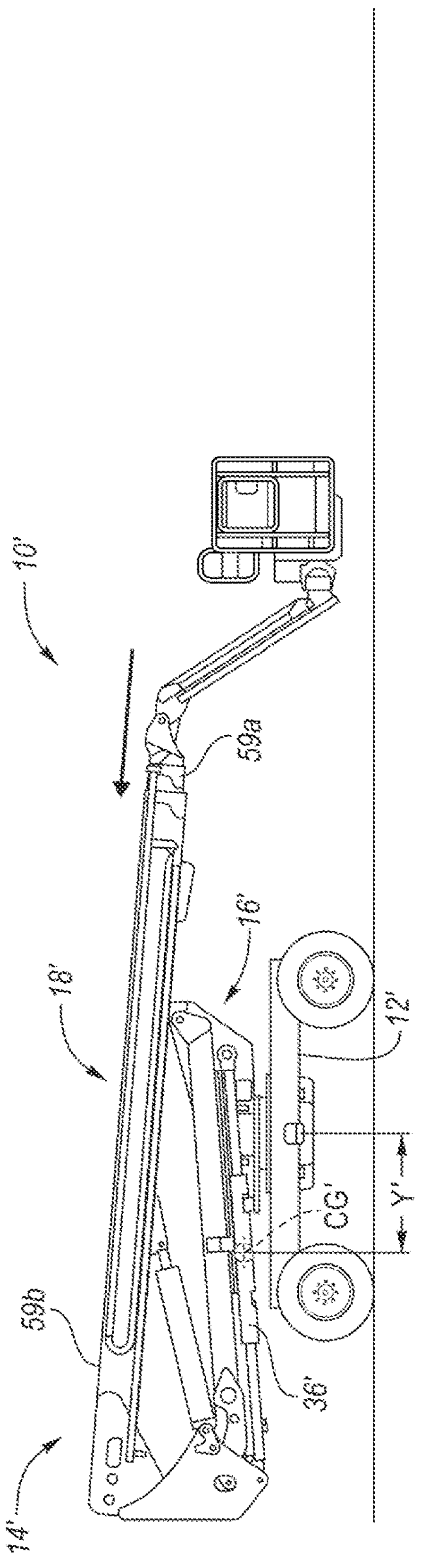
FIG. 8B is a side view of the vehicle shown in FIG. 8A, wherein an upper boom structure of the boom assembly is shown in a retracted position.
Figure 8C:
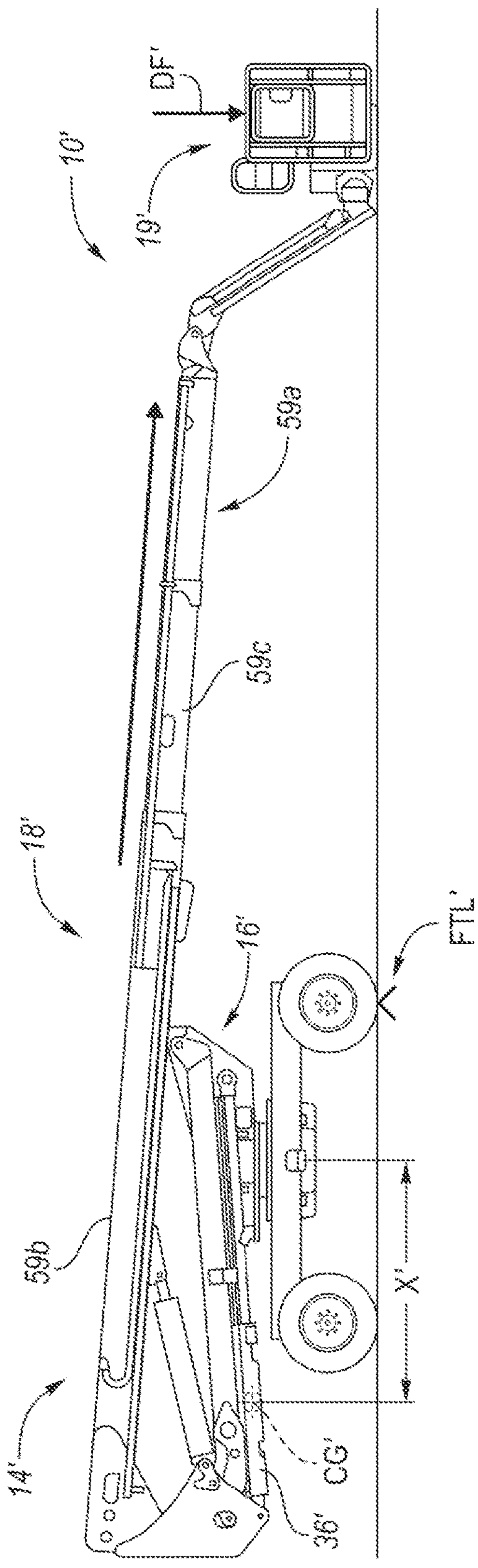
FIG. 8C is a side view of the vehicle of FIG. 8B, with the upper boom structure shown in an extended position.

FIGS. 8A-C show a second embodiment 14' of a boom assembly and associated vehicle 10' according to the present disclosure. The boom assembly 14' includes similar features as the boom assembly 14, and those similar features are identified with similar reference numbers, except the similar reference numbers in FIGS. 8A-C each include a prime mark.

The boom assembly 14' is not only movable between lowered and raised positions, but is also movable between retracted and extended positions. For example, lower boom structure 16' and upper boom structure 18' of the boom assembly 14' may pivot as described above in connection with the boom assembly 14, and one or both of the boom structures 16', 18' may move between retracted and extended positions. As a more detailed example, the upper boom structure 18' may include a first portion **59*a* that is slidable or translatable with respect to a second portion 59*b* between a retracted position shown in FIG. 8B and an extended position shown in FIG. 8C. Likewise, the lower boom structure 16' may include a first portion that is slidable or translatable with respect to a second portion between a retracted position and an extended position. One or both of the boom structures 16', 18' may also include one or more intermediate portions that are also slidable or translatable with respect to the associated second portion. In the illustrated embodiment, for example, the upper boom structure 18' includes an intermediate portion 59*c* that is translatable with respect to the second portion 59*b*, and the first portion 59*a* is translatable with respect to the intermediate portion 59*c***.

The boom assembly 14' further includes a counterweight 36' that is movable for adjusting a center of gravity or center of mass of the boom assembly 14' in order to maintain a center of mass of the associated vehicle 10' in a desired location or area (e.g., within a "tip line" or "tipping line" of the vehicle 10') as the boom assembly 14' moves between lowered and raised positions and/or when the boom assembly 14' is moved between retracted and extended positions. Generally, the counterweight 36' is movable along one of the boom structures 16', 18' when at least a portion of the lower boom structure 16' is moved relative to the upper boom structure 18' or when at least a portion of the upper boom structure 18' is moved relative to the lower boom structure 16'. Referring to FIG. 8C, for example, the counterweight 36' may be movable along the lower boom structure 16' so that a center of gravity CG' of the counterweight 36' may be positioned as far away (e.g., to the left in FIG. 8C) as possible with respect to a center of chassis 12' when the upper boom structure 18' is moved to the extended position (i.e., when the first portion **59*a* is moved with respect to the second portion 59*b* and the lower boom structure 16' to the extend position). As a result, a distance X' between the center of gravity CG' of the counterweight 36' and the center of the chassis 12' may be at a maximum when the upper boom structure 18' is in its extended position. With such a configuration, a potential tipping situation (e.g., a forward tipping situation) about a tipping line (e.g., a forward or front tipping line FTL') may be inhibited or avoided when a downward force DF' (caused by workers, tools, cargo, etc. and/or contact with a structure) is applied to work platform 19'. When the upper boom structure 18' is moved from the extended position toward the retracted position shown in FIG. 8B, the counterweight 36' may be moved to the right along the lower boom structure 16' (i.e., toward the end of the lower boom structure 16' that is pivotably connected directly or indirectly to the chassis 12'). As a result, the center of gravity CG' of the counterweight 36' may be positioned closer to the center of the chassis 12' so that a distance Y' between the center of gravity CG' of the counterweight 36' and the center of the chassis 12'** is smaller than the distance X'.

Referring to FIG. 8A, the boom assembly 14' includes a drive mechanism or member 38' for moving (e.g., translating) the counterweight 36' along the lower boom structure 16' independent of the angular or pivoted position of the lower boom structure 16' and/or the upper boom structure 18'. In the embodiment shown in FIG. 8A, the drive member 38' comprises a cylinder 60, such as a hydraulic cylinder or a pneumatic cylinder (e.g., a piston connected to a piston rod, and a corresponding chamber or cylinder barrel that receives the piston), connected to the counterweight 36' for moving the counterweight 36'. The cylinder 60 has a first end pivotally connected to the counterweight 36', and an opposite second end pivotally connected directly to the chassis 12' or to a support member, such as a rotatable turret or turntable 42', mounted on the chassis 12'. The boom assembly 14' further includes a control unit 66 (shown schematically in FIG. 8A) associated with the cylinder 60 (e.g., electrically or wirelessly connected to the cylinder 60) for controlling operation of the cylinder 60 when the boom assembly 14' is moved between lowered and raised positions and/or when the boom assembly 14' is moved between retracted and extended positions. For example, the control unit 66 may control movement of the cylinder 60 based on any one or more of the following: orientation of the chassis 12', position of the lower boom structure 16' (e.g., angular position of the lower boom structure 16' and/or position of the first portion relative to the second portion), position of the upper boom structure 18' (e.g., angular position of the upper boom structure 18' and/or position of the first portion 59*a* relative to the second portion 59*b*), position of a work platform (not shown) or other suitable component attached to the upper boom structure, or load on such a work platform or other component attached to the upper boom structure 18'. As a more detailed example, the control unit 66 may control the cylinder 60 so that the cylinder 60 automatically retracts when the upper boom structure 18' is moved from the lowered position to the raised position (mentioned above with respect to the boom assembly 14) so that the counterweight 36' moves toward chassis 12', and the control unit 66 may control the cylinder 60 so that the cylinder 60 automatically extends when the upper boom structure 18' is moved from the raised position to the lowered position. As another example, the control unit 66 may control the cylinder 60 so that the cylinder 60 automatically retracts when the upper boom structure 18' is moved from the extended position (shown in FIG. 8C) toward the retracted position (shown in FIG. 8B) so that the counterweight 36' moves toward the chassis 12', and the control unit 66 may control the cylinder 60 so that the cylinder 60 automatically extends when the upper boom structure 18' is moved from the retracted position toward the extended position. The control unit 66 may also be attached at any suitable location on the boom assembly 14', or to any suitable location on the associated vehicle.

Figure 9:
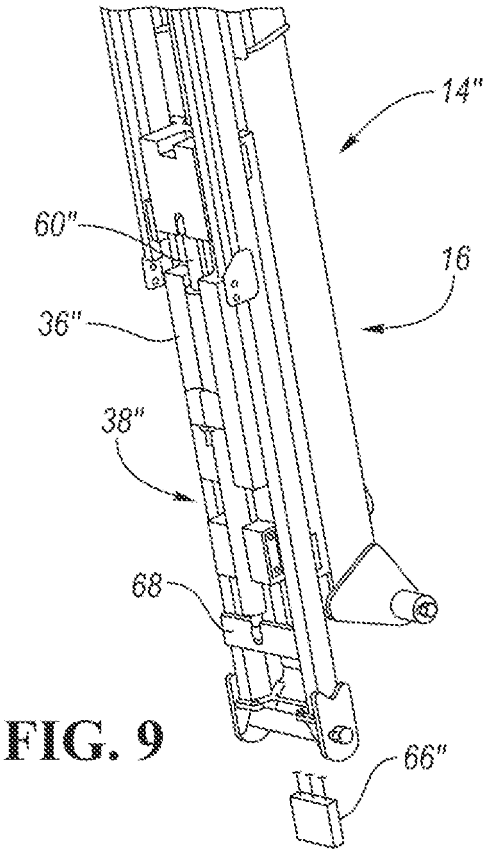
FIG. 9 is a fragmentary perspective view of a portion of the boom assembly according to a third embodiment.

FIG. 9 shows a third embodiment 14" of a boom assembly according to the present disclosure. The boom assembly 14" includes similar features as the boom assembly 14', and those similar features are identified with similar reference numbers, except the similar reference numbers in FIG. 9 each include a double prime mark. The boom assembly 14" includes a drive mechanism or member 38" that also comprises a cylinder 60", such as a hydraulic cylinder or a pneumatic cylinder, connected to counterweight 36" for moving (e.g., linearly translating) the counterweight 36". In this embodiment, the cylinder 60" has a first end connected to the counterweight 36", and an opposite second end connected to a mount 68, such as a riser arm weldment, of lower boom structure 16". The cylinder 60" is also received in a channel formed in the counterweight 36". The boom assembly 14" further includes a control unit 66" (shown schematically in FIG. 9) associated with the cylinder 60" (e.g., electrically or wirelessly connected to the cylinder 60") for controlling operation of the cylinder 60" as the boom assembly 14" is moved between lowered and raised positions and/or when the boom assembly 14" is moved between retracted and extended positions. For example, the control unit 66" may control movement of the cylinder 60" in a similar manner as described above respect to the control unit 66 and the cylinder 60 of the boom assembly 14'. With the above configuration of the cylinder 60", however, the cylinder 60" and the counterweight 36" may move (e.g., translate linearly) in the same direction. Furthermore, the control unit 66" may also be attached at any suitable location on the boom assembly 14", or to any suitable location on the associated vehicle.

Figure 10:
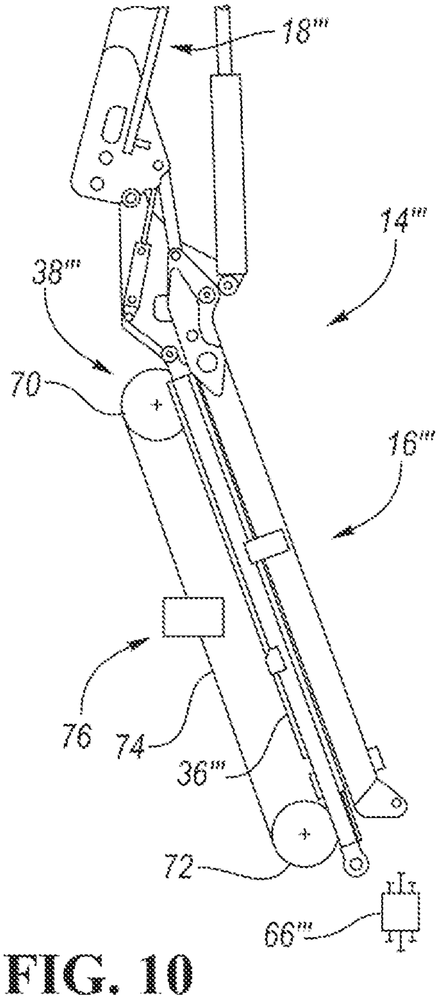
FIG. 10 is a fragmentary side view of a portion of a boom assembly according to a fourth embodiment.

FIG. 10 shows a fourth embodiment 14'" of a boom assembly according to the present disclosure. The boom assembly 14'" includes similar features as the boom assembly 14", and those similar features are identified with similar reference numbers, except the similar reference numbers in FIG. 10 each include a triple prime mark. The boom assembly 14'" includes a drive mechanism 38'" that comprises at least one gear or pulley and a drive member, such as a chain or belt, associated with the at least one pulley and counterweight 36'" for moving (e.g., linearly translating) the counterweight 36'". In the illustrated embodiment, drive mechanism 38'" includes first and second pulleys 70 and 72, respectively, disposed at opposite ends of lower boom structure 16'", and a chain 74 that extends around each pulley 70, 72. The chain 74 further has opposite ends connected to the counterweight 36'". The drive mechanism 38'" also includes a driver 76, such as a motor or motor/gearbox, connected to the chain 74 for moving the chain 74 and the counterweight 36'", and a control unit 66'" (shown schematically in FIG. 10) associated with the driver 76 (e.g., electrically or wirelessly connected to the driver 76) for controlling operation of the driver 76 and the rest of the drive mechanism 38'" as the boom assembly 14'" is moved between lowered and raised positions and/or when the boom assembly 14'" is moved between retracted and extended positions. For example, the control unit 66'" may cause the driver 76 to move in a first direction to slide or translate the counterweight 36'" along the lower boom structure 16'" and toward the chassis 12'" when the upper boom structure 18'" is moved from the lowered position to the raised position, and the control unit 66'" may cause the driver 76 to move in a second direction opposite the first direction to slide or translate the counterweight 36'" along the lower boom structure 16'" and toward the upper boom structure 18'" when the upper boom structure 18'" is moved from the raised position to the lowered position. As another example, the control unit 66''' may cause the driver 76 to move in the first direction to slide or translate the counterweight 36''' along the lower boom structure 16''' and toward the chassis 12''' when the upper boom structure 18''' is moved from the extended position toward the retracted position, and the control unit 66''' may cause the driver 76 to move in the second direction opposite the first direction to slide or translate the counterweight 36''' along the lower boom structure 16''' and toward the upper boom structure 18''' when the upper boom structure 18''' is moved from the retracted position toward the extended position. Furthermore, the control unit 66''' may also be attached at any suitable location on the boom assembly 14''', or to any suitable location on the associated vehicle.

In each of the second, third and fourth embodiments, the respective control unit may accurately control movement of the respective counterweight based on one or more of the following: orientation of the associated vehicle chassis, position of at least a portion of the lower boom structure (e.g., angular position of the lower boom structure and/or position of the first portion relative to the second portion), position of at least a portion of the upper boom structure (e.g., angular position of the upper boom structure and/or position of the first portion relative to the second portion), position of the work platform or other component attached to the upper boom structure, load on the work platform or other component attached to the upper boom structure, etc. Furthermore, the above orientation, positions and load may be determined by suitable sensors (e.g., position sensors, weight sensors, etc.). In addition, each control unit may comprise appropriate circuitry, such as one or more appropriately programmed processors (e.g., one or more microprocessors, microcontrollers and/or programmable digital signal processors) and associated memory, which may include stored operating system software and/or application software (e.g., code or instructions) executable by the processor(s) for controlling operation thereof, so that the control unit may perform particular algorithms represented by the functions and/or operations described herein. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A boom assembly comprising:

a base;

a support member connected to the base;

a lower boom structure connected to the base so that the lower boom structure is pivotable with respect to the base between a lowered position of the lower boom structure and a raised position of the lower boom structure;

an upper boom structure having a first end connected to the lower boom structure, and an opposite second end, wherein the upper boom structure is pivotable with respect to the lower boom structure between a lowered position of the upper boom structure and a raised position of the upper boom structure in which the second end is positioned above the lower boom structure;

a counterweight movably mounted on the lower boom structure and movable along the lower boom structure when at least a portion of the lower boom structure is moved relative to the base; and a link having a first end pivotably connected to the counterweight and a second end pivotally connected directly to the support member.

2. The boom assembly of claim 1 wherein the counterweight is slidably mounted on the lower boom structure.

3. The boom assembly of claim 1 wherein the link is configured to move the counterweight downwardly along the lower boom structure when the lower boom structure is moved from the lowered position of the lower boom structure to the raised position of the lower boom structure.

4. The boom assembly of claim 1 wherein the link comprises a cylinder connected to the counterweight for translating the counterweight along the lower boom structure.

5. The boom assembly of claim 1 wherein the lower boom structure includes an elongated guide member, and the counterweight includes one or more guide elements that are engageable with the elongated guide member.

6. The boom assembly of claim 1 further comprising a connecting element for connecting the link to the counterweight, and a first bearing element and a second bearing element positioned at opposite ends of the connecting element for slidably engaging the lower boom structure.

7. The boom assembly of claim 6 wherein the lower boom structure comprises two elongated guide members disposed on opposite sides of the counterweight, and the counterweight includes a first bearing element and a second bearing element that are each engageable with a first side of a respective elongated guide member, wherein the first and second bearing elements positioned at opposite ends of the connecting element are each located adjacent to a second side of a respective elongated guide member that is opposite the first side of the elongated guide member.

8. The boom assembly of claim 1 wherein the counterweight is translatable along the lower boom structure when the lower boom structure is pivoted with respect to the base.

9. The boom assembly of claim 1 wherein the counterweight is translatable along the lower boom structure when a section of the lower boom structure is moved between a retracted position and an extended position.

10. The boom assembly of claim 1 wherein the support member is rotatably mounted on the base, the lower boom structure has a first end pivotally connected to the support member, and a second end pivotally connected to the first end of the upper boom structure, and wherein the counterweight is movable along the lower boom structure between the first and second ends of the lower boom structure.

11. The boom assembly of claim 1 wherein the link is configured to move the counterweight downwardly along the lower boom structure when the lower boom structure is moved from the lowered position of the lower boom structure to the raised position of the lower boom structure.

12. A vehicle comprising:

a chassis;

a support member rotatably mounted on the chassis;

a lower boom structure mounted on the chassis so that the lower boom structure is pivotable between a lowered position of the lower boom structure and a raised position of the lower boom structure;

an upper boom structure having a first end attached to the lower boom structure, and an opposite second end, and wherein the upper boom structure is pivotable relative to the lower boom structure between a lowered position and a raised position in which the second end is positioned above the lower boom structure;

a counterweight movably mounted on the lower boom structure and translatable along the lower boom structure when at least a portion of the lower boom structure is moved relative to the upper boom structure; and a drive member having a first end connected to the counterweight and a second end connected directly to the support member;

wherein the lower boom structure has a first end pivotally connected to the support member, and a second end pivotally connected to the first end of the upper boom structure, and wherein the counterweight is movable along the lower boom structure between the first and second ends of the lower boom structure.

13. The vehicle of claim 12 wherein the drive member comprises a link for moving the counterweight along the lower boom structure when the upper boom structure is pivoted between the lowered and raised positions.

14. The vehicle of claim 12 wherein the drive member is configured to translate the counterweight along the lower boom structure.

15. The vehicle of claim 12 wherein the drive member comprises a cylinder.

16. The vehicle of claim 12 further comprising a control unit associated with the drive member and configured to control operation of the drive member, based on position of one or both of the boom structures, in order to control position of the counterweight with respect to the lower boom structure.

17. The vehicle of claim 12 wherein the counterweight is translatable along the lower boom structure when the upper boom structure is pivoted with respect to the lower boom structure or when the lower boom structure is pivoted with respect to the upper boom structure.

18. The vehicle of claim 12 wherein the counterweight is translatable along the lower boom structure when a portion of the upper boom structure is moved between a retracted position and an extended position or when a portion of the lower boom structure is moved between a retracted position and an extended position.

19. A boom assembly comprising:

a base;

a support member rotatably mounted on the base;

a lower boom structure pivotally connected to the support member so that the lower boom structure is pivotable with respect to the support member and the base between a lowered position of the lower boom structure and a raised position of the lower boom structure;

an upper boom structure connected to the lower boom structure and movable between a lowered position of the upper boom structure and a raised position of the upper boom structure;

a counterweight movably mounted on the lower boom structure; and a link having a first end pivotably connected to the counterweight and a second end pivotally connected directly to the support member, wherein the link is configured to move the counterweight downwardly along the lower boom structure when the lower boom structure is moved from the lowered position of the lower boom structure to the raised position of the lower boom structure.

* * * * *